United States Patent

Takahashi

[15] 3,668,288
[45] June 6, 1972

[54] METHOD FOR MAKING THERMOPLASTIC SYNTHETIC RESIN HOLLOW STRUCTURE ARTICLES

[72] Inventor: Keiichi Takahashi, 340-656-3 Nakakaku-bu, Ichikawa-shi, Japan

[22] Filed: July 30, 1969

[21] Appl. No.: 846,089

[30] Foreign Application Priority Data

Apr. 2, 1969 Japan..............................44/24738
Nov. 18, 1968 Japan..............................43/83772
Dec. 18, 1968 Japan..............................43/92328

[52] U.S. Cl............................264/47, 264/235, 264/237, 18/13 F, 18/14 A, 264/89, 264/90, 264/95, 264/173, 264/209

[51] Int. Cl..............B29c 17/07, B29c 25/00, B29d 23/04, B29d 27/00

[58] Field of Search..............264/47, 89, 90, 95, 173, 209, 264/235, 237, 346; 18/4 S, 13 F, 13 K, 13 RR, 14 A, 14 S

[56] References Cited

UNITED STATES PATENTS

| 3,229,005 | 1/1966 | Reifenhauser | 264/47 |
| 3,296,661 | 1/1967 | Moustier | 264/89 X |
| 2,423,260 | 7/1947 | Slaughter | 18/14 A X |
| 2,708,772 | 5/1955 | Moncrieff | 18/14 A X |
| 3,142,092 | 7/1964 | Ralston | 264/209 UX |
| 3,461,199 | 8/1969 | Campbell | 264/346 X |
| 3,274,315 | 9/1966 | Kawamura | 264/209 X |
| 3,222,722 | 12/1965 | Reifenhauser | 264/47 X |
| 3,504,077 | 3/1970 | Sloan | 264/235 X |

FOREIGN PATENTS OR APPLICATIONS

| 664,048 | 5/1963 | Canada | 264/95 |
| 853,745 | 11/1960 | Great Britain | 264/209 |

Primary Examiner—Robert F. White
Assistant Examiner—J. H. Silbaugh
Attorney—Wenderoth, Lind & Ponack

[57] ABSTRACT

A method for continuously making hollow structures of thermoplastic synthetic resin. The resin is heated and extruded to form a continuous hollow structure. Fluid coolant is forced onto the outer surface of the structure and subsequently removed so as to provide for cooling of the outer surface of the structure without retaining stress therein due to quick cooling of the structure. The structure is then continuously shaped in an externally disposed suction mechanism while slowly cooling the structure. The structure may then be reheated to remove any residual stress.

24 Claims, 9 Drawing Figures

METHOD FOR MAKING THERMOPLASTIC SYNTHETIC RESIN HOLLOW STRUCTURE ARTICLES

BACKGROUND OF THE INVENTION

In the manufacture of continuous hollow structure articles having a predetermined cross-sectional configuration by heating thermoplastic synthetic resin to a shaping temperature and extruding the material through an extruder using a die having a mandrel, there are known various types of water cooling systems and exterior suction-and-contact cooling systems or the like, in which the hollow structures remaining at a high temperature and in a deformable state are cooled while maintaining the hollow cross-sectional configuration as imparted. The manufacture of such articles by these systems and the products resulting therefrom have a number of problems left still to be solved as will now be described. The present invention contemplates to solve and overcome these problems peculiar to the prior art.

According to the prior art, the water cooling systems in which deformable hollow structures are bathed in a water tank enable the quick cooling and solidification of the extruded hollow structures. Although this system allows high productivity, the dimensional accuracy of the products cannot be ensured since no provision is made of means for controlling the exterior dimensions of the hollow structures during the cooling operation. Another disadvantage of the prior art water cooling systems is that wrinkles tend to be formed in the inner surface of the hollow structures due to the quick cooling and shrink of the outer surface of the hollow structures which is caused while the structures are still in a deformable state. Still another disadvantage of the conventional water cooling systems is that the quick cooling and solidification of the hollow structures does not allow a sufficient length of time for removing any internal stress which may remain in the hollow structures, and this leads to the presence of such internal stress residual in the end products, which in turn results in age-strain of the products. Yet another disadvantage is that the quick cooling and solidification of the hollow structures fails to provide sufficient crystallization of the hollow structure resin, and this leads to a low mechanical strength of the end products.

The exterior suction-and-contact cooling system or the like according to the prior art has an advantage that the dimensional accuracy of the extruded hollow structures is ensured. Such system, however, suffers from a disadvantage that the outer surface of the hollow structures extruded from a die device and still retaining a high temperature and tackiness or adhesion tends to adhere to the inner surface and sucking ports of a sucking device, resulting in inconvenient operational troubles and lower productivity. Also, the fact that the heat exchange in such system is provided only by the contact between the inner surface of the exterior suction-and-contact cooling system and the outer surface of the hollow structure results in a very low efficiency of heat exchange, which also is a disadvantage in that a long period of time is required for the cooling and solidification of the hollow structures.

SUMMARY OF THE INVENTION

It is an object of the present invention to overcome the described disadvantages existing in the prior art by making continuous hollow structure articles extruded by an extruder device using a die having one or more mandrels, thereby to increase the production capacity of hollow structure articles produced by a series of devices as well as to provide good products which would be free from any-age strain or age-deformation.

The present invention relates to a method of making hollow structure articles of good quality with a high production efficiency, and in which coolant liquid is contacted with hollow structures as they are extruded from the extruder device and are still in a deformable state, so as to cool down the hollow structures by utilizing the good solid-liquid heat exchangeability, then the quick cooling of the structures effected by the liquid is stopped at a point as desired, whereafter it is replaced by a slow cooling for shaping the structures into prescribed dimensions and subsequently the hollow structures are subjected to heating, whereby good products are ensured.

It is an object of the present invention to prevent the adhesion between the inner surface of the shaping apparatus and the outer surface of the thermoplastic synthetic resin hollow structures extruded from the extruder device and retaining a high temperature and tackiness or adhesion, and thereby to increase the productivity of such articles.

It is another object of the present invention to blow coolant air against the surface of the hollow structures extruded from the extruder device while still retaining a high temperature and tackiness or adhesion so as to remove the tackiness or adhesion from the structures and thereby prevent the hollow structures from adhering to the inner surface of the shaping apparatus, as well as to suitably cool slowly the hollow structures to provide articles free from any residual internal stress.

It is still another object of the present invention to contact a coolant liquid, for a suitable length of time, with the thermoplastic synthetic resin hollow structures extruded by the extruder device while still retaining a high temperature, and quickly cool down the hollow structure article by utilizing the high solid-liquid heat exchangeability, thereby increasing the productivity of such articles.

It is still another object of the present invention to place the thermoplastic synthetic resin hollow structures extruded by the extruder device into the shaping apparatus while the article is still in a deformable state, to thereby shape the structures into predetermined cross-sectional configuration and remove any internal stress therefrom to expedite the crystallization of the structure resin so as to provide products of predetermined dimensions and great mechanical strength.

It is yet another object of the present invention to heat the hollow structures extruded from the extruder device to sufficiently remove any internal stress therefrom and thereby expedite the crystallization of the resin so as to prevent any age-deformation of the products as well as to increase the mechanical strength thereof.

BRIEF DESCRIPTION OF THE DRAWINGS

These and other objects and features of the present invention will become more fully apparent from the following description of the invention taken in conjunction with the accompanying drawings, in which.

DETAILED DESCRIPTION OF THE INVENTION

Figures 6, 7, 8:
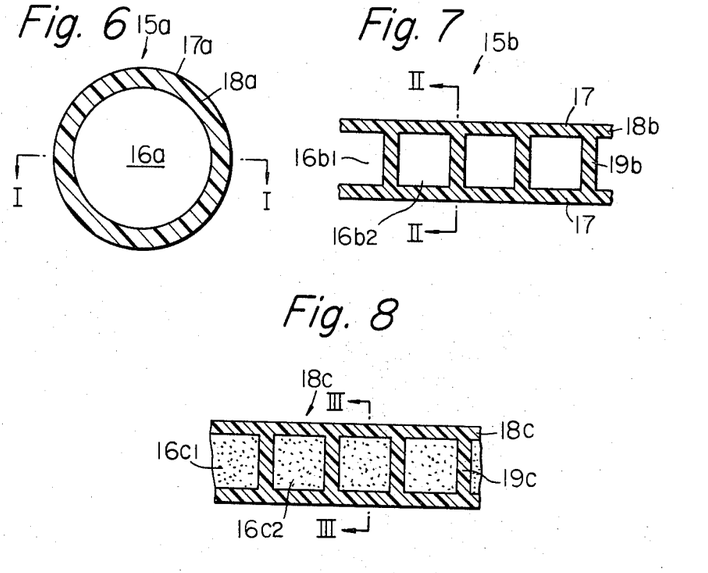
FIGS. 6 to 9 illustrate various cross sections of the products provided according to the method and apparatus of the present invention.
Figure 9:
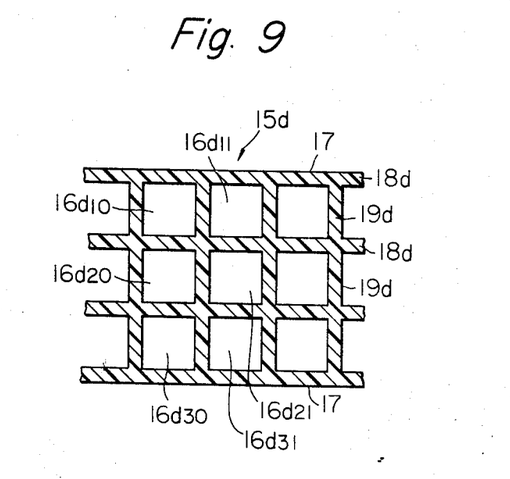

When thermoplastic synthetic resin is heated to its melting temperature or above and extruded by an extruder device into the form of a thermoplastic synthetic resin hollow structure having a cross section as shown in any of FIGS. 6 to 9, the head opening of a die used for this purpose corresponds to the sectional configuration of a hollow structure 18 or 19. In the case where the hollow structure takes a cylindrical configuration as shown in FIG. 6, the die has a single mandrel therein corresponding in configuration to the hollow portion 16a in said hollow structure 18. In case of a hollow board structure as shown in FIG. 7, the die in use has a plurality of mandrels corresponding in configuration to hollow portions 16b1, 16b2 and so on. In the case where a multi-layer hollow board structure as shown in FIG. 9 is to be produced, the die used for the manufacture of such structure is provided therein with a plurality of mandrels arranged in rows and columns corresponding to hollow portions 16d10, etc. 16d20, etc., 16d30, etc. The hollow structure 18 alone or hollow structures 18 and 19 are extruded through a clearance 12 between a die 11 and its mandrels 13 and through a clearance between these mandrels, as shown in FIG. 1, and thereafter the thus extruded hollow structure or structures are cooled and solidified, then heated to provide a continuous article having a desired cross-sectional configuration.

Figure 1:
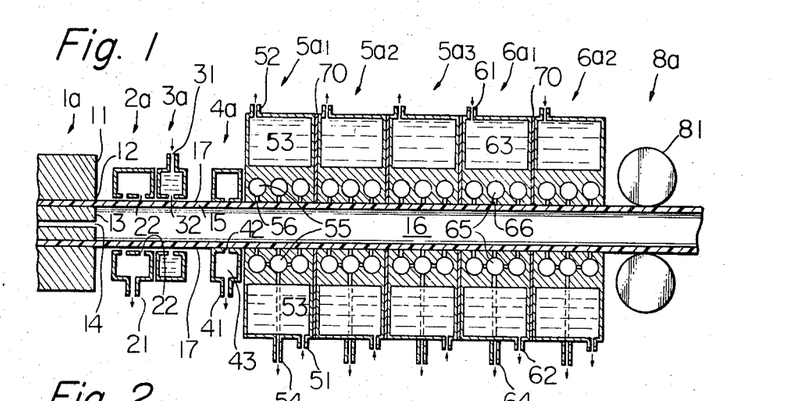
FIG. 1 is a longitudinal sectional view of an embodiment of the present invention which is used to make cylindrical hollow structure articles as shown in FIG. 6.

Referring now to FIG. 1, there is shown an extruder device 1a which comprises an extruder (not shown) and a die 11 having a mandrel 13. Between the die 11 and the mandrel 13 there is provided clearance 12 through which a deformable continuous hollow member 15 is extruded. As a means for preventing the deformation of the deformable hollow member 15, there is provided in each mandrel an air passage 14 through which air under pressure is introduced from a separate air compressor (not shown) into the hollow portion 16 of the hollow member 15.

The embodiment shown in FIG. 1 comprises an extruder device 1a, a back-flow take-off device 2a, a coolant liquid coating device 3a, a coolant liquid sucking device 4a, sizing devices 5a1, 5a2 and 5a3, and heating devices 6a1 and 6a2. All these various devices are disposed to surround the entire outer peripheral surface of the hollow member 15. While the extruder device 1a is of the construction as described above, the back-flow removing device 2a is disposed between the extruder device 1a and the coolant liquid coating device 3a and as closely as possible to the latter device 3a. Said back-flow take-off device 2a is provided with an exhaust pipe 21 communicating with a vacuum source (not shown) and has a plurality of back-flow liquid sucking ports 22 facing the outer surface 17 of the hollow member 15. The back-flow liquid sucking ports 22 are closely spaced from the outer surface 17 of the hollow member 15 in such a degree that the suction force of said ports can effectively acts on the back-flow liquid over the outer surface 17 of the hollow member.

The coolant liquid coating device 3a has an inlet 31 communicating with a coolant liquid supply source (not shown) and is provided with a plurality of outlets 32 for injecting coolant liquid therethrough. The coolant liquid coating device shown in Figure 1 is of a shower type, but it may be either of a spray type or, if only for the fine application of the coolant liquid, of a permeate type as shown in later embodiments. In any event the coolant liquid coating device is adapted to apply coolant liquid onto the entire outer surface 17 of the hollow member 15. Next to the coolant liquid device there is provided the coolant liquid sucking device 4a which comprises an exhaust pipe 41 and a chamber 43 both communicating with a vacuum source (not shown), and a plurality of sucking ports 42 disposed adjacent to the outer surface 17 of the hollow member 15.

A series of sizing devices 5a1, 5a2 and 5a3 are formed of metal and each of them comprises an outer part and an inner part. The outer part consists of an inlet 51 communicating with a coolant liquid supply source (not shown), an outlet 52 and a chamber 53 both communicating with an exhaust means for exhausting the coolant rendered hot. The inner part of each sizing device consists of an exhaust pipe 54 and air passage 55 both communicating with a vacuum source (not shown), and a plurality of opening means 56 provided in the inner surface of said inner part so as to impart suction force to the outer surface 17 of the hollow member. It is desirable that the inner surface of the inner part of each sizing devices to plated so as to permit the smooth passage of the hollow member 15 therethrough and ensure the smooth finish of the outer surface 17 of the hollow member. While three sizing devices 5a1, 5a2 and 5a3 are shown in FIG. 1, the number of such sizing devices may be suitably selected as required.

As shown in Figure 1, the heating devices 6a1 and 6a2 are similar in construction to the sizing devices 5a1, 5a2 and 5a3, except that each heating device has an inlet 61 communicating with a heat source (not shown) and adapted to introduce a heating medium into a chamber 63, from which the heating medium now at a lower temperature is exhausted through an outlet 62 to heat the inner part of the heating device. It is desirable that heat insulating material 70 be interposed between the adjacent sizing devices and heating or annealing devices in the manner as shown.

Figure 1 shows, in longitudinal cross section, the entire apparatus according to an embodiment of the present invention and the hollow structure being produced thereby, and it will be seen from the foregoing description that the construction of the apparatus is such that each of the various devices surrounds the hollow structure so as to act on the entire outer surface 17 thereof.

Next to the last of the heating devices there is provided a product drawing device 8a which comprises a plurality of rollers 81 driven from separate power sources (not shown) so as to pinch and draw the product therebetween.

In the shown embodiment, it is needless to say that each of the various devices is movable to adjust the spacing between the adjacent devices as desired.

In the apparatus for making thermoplastic synthetic resin hollow structures constructed by such devices as described above, the hollow member 15 extruded by the extruder device 1a is still at a high temperature and in a deformable state and the outer surface thereof is tacky or adhesive. If the hollow member 15 is moved forward without being subjected to any treatment into the sizing device 5a1 where the member 15 contacts the inner surface of the sizing device and subjected to suction by the opening means 56, then the outer surface of the hollow member 15 will adhere to the inner surface and opening means of the sizing device to thereby cause the production to be stopped or delayed. In order to eliminate such possible trouble, coolant liquid is applied onto the outer surface 17 of the hollow member 15 by the coolant liquid coating device 3a before the hollow member enters the sizing device 5a1. The coolant liquid is injected in a shower form through the outlet 32 of the coolant liquid coating device 3a to quickly cool the entire outer surface of the hollow member 15 due to the highly efficient liquid-solid heat exchange and thereby removes the tackiness or adhesion from the outer surface of the hollow member. In this embodiment the coolant is applied in a shower form onto the hollow member, whereas the spray type coolant coating is preferred to the shower type for the purpose of adjusting the amount of coolant to be applied.

Should the coolant liquid flow back toward the extruder device when it is being applied in the described manner, trouble will be caused with respect to the extrusion operation and the extruded hollow member. In order to prevent such back-flow of the coolant, the back-flow take-off device 2a is provided between the extruder device 1a and the coolant liquid coating device 3a, and an exhaust pipe 21 thereof which is communicated with the vacuum source (not shown) causes sucking ports 22 adjacent the outer surface of the hollow member to produce suction force which will suck and remove any back-flow of the coolant to thereby obviate said trouble.

However, an excessively small distance from the sucking ports 22 of the back-flow take-off device 2a to the outer surface of the hollow structure may cause the cross-sectional configuration of the still deformable hollow member 15 to be deformed, and for this reason the distance between said sucking ports 22 and said outer surface of the hollow member must be suitably selected. Also, the spacing between said device 2a and the coolant fluid coating device 3a should desirably be as small as possible because said spacing affects the cooling of the hollow member as will be described later. Therefore, the device 2a should be so designed as to be movable vertically and horizontally.

The coolant liquid applied over the hollow member by the coolant liquid coating device 3a causes the entire outer peripheral surface of the hollow member to be quickly cooled with the aid of the highly efficient liquid-solid heat exchange and to eliminate tackiness or adhesion. However, the fall of the temperature, and accordingly the shrink and solidification, of the hollow structure 18, would not progress rapidly since the hollow structure is of plastic material which is of very low heat conductivity. While in this way only the outer surface 17 of the hollow member 15 loses its tackiness or adhesion with the fall of its temperature and before the hollow structure 18 starts to shrink and solidify, said coolant liquid over the outer surface 17 of the hollow structure 18 must be removed therefrom so as to delay the shrink and solidification of the hollow structure 18. For this purpose there is provided a coolant liquid take-off device 4a suitably spaced apart from the coolant liquid coating device. The exhaust pipe 41 of this coolant liquid take-off device 4a is communicated with a vacuum source (not shown), whose vacuum force passes through the chamber 43 to act on the inlet 42 of the device 4a adjacent the outer surface of the hollow structure, whereby the coolant liquid is removed from the outer surface of the hollow structure to achieve the above-described effect.

After the hollow member 15 has entered the coolant fluid take-off device 4a, it should be noted that the spacing between the coolant liquid coating device 3a and the coolant liquid take-off device 4a must be reduced to shorten the time for cooling effected by the coolant, if the hollow structure should shrink and solidify to reduce the operational effect of the sizing devices 5a to 5c, or if the internal stress in the hollow structure is great, or if the crystallization of the structure resin does not progress. If the coolant take-off effect above described could not be attained by the adjustment of said spacing between the device 3a and the device 4a, the temperature of the coolant liquid must be raised so as to reduce the temperature difference between the coolant liquid and the hollow structure so that the cooling of the hollow structure by the coolant may be reduced.

As has been described above, the cooling of the hollow structure by the coolant liquid is greatly affected by the time during which the coolant liquid remains attached to the outer surface of the hollow structure, and therefore such time must be strictly adjusted. However, should there take place any irregular back-flow of the coolant liquid, it will become difficult to effect the strict adjustment of the time during which the coolant is attached to the outer surface of the hollow structure. For this reason, the back-flow liquid take-off device 2a should be positioned closely to the coolant liquid coating device 3a as has previously been described, so that any back-flow of the coolant fluid may be immediately eliminated and said time during which the coolant liquid is attached to the outer surface of the hollow structure may be adjusted by the spacing between the coolant liquid coating device 3a and the coolant liquid sucking device 4a.

In the case where the adjustment of the short-time cooling effected by the coolant liquid is still hard to carry out even by the use of the above-described adjusting method, the cooling operation by the coolant liquid must be stopped and instead the coolant fluid coating device 3a must be employed with its inlet 31 connected with a compressed air source (not shown) so that coolant air from said compressed air source is blown onto the outer surface of the hollow structure through the outlets 32 of the coolant liquid coating device 3a.

When the coolant liquid on the outer surface 17 of the hollow member 15 has been removed therefrom by the coolant liquid take-off device 4a, said outer surface 17 has been solidified but the hollow member 15 enters the sizing devices while the hollow structure 18 of the hollow member 15 remains in a deformable state. Therefore, as shown, in the outer part of each sizing device 5a1, 5a2, 5a3 formed of metal, coolant is supplied into the cooling chamber 53 through the inlet 51 so as to maintain the sizing devices at a low temperature and the coolant now rendered hot is discharged through the outlet 52. In the inner part of each sizing device, a plurality of opening means 56 are provided in communication with a vacuum source (not shown) through the vacuum passages 55 and exhaust pipe 54, so as to permit suction force to act therethrough. By the time it enters these sizing devices 5a1, 5a2 and 5a3, the hollow member has been cooled by the coolant as described and has lost the tackiness or adhesion on the outer surface thereof, and the hollow member can smoothly pass through these sizing devices without adhering to the inner surface and said opening means of the sizing devices and without causing any trouble in operation. As it enters the sizing devices the hollow member 15 has its outer surface 17 alone solidified but its structure 18 is still deformable, and therefore the outer surface 17 of the hollow member 15 is brought into contact with the inner surface of the sizing devices by the inner action from the compressed air introduced into the hollow portion 16 and by the outer action from the suction force in each sizing device. Since the outer surface of the hollow member has been solidified by that time, the heat exchange due to the contact between the outer surface of the hollow member and the inner surface of each sizing device is a solid-solid heat exchange which is much lower in efficiency than the heat exchange due to the liquid-solid wetting. Therefore, such solid-solid heat exchange has a very low effect on the cooling of the hollow member even when the inner surface of the sizing devices is at a very low temperature, and accordingly, the rapid cooling of the hollow structure member which is taking place due to said liquid-solid wetting will now turn to a slow cooling due to the contact between the outer surface of the hollow structure and the inner surface of each sizing device.

After the removal of the coolant liquid by the coolant liquid take-off device 4a, the hollow structure member is subjected to a slow cooling resulting in reduced shrink which in turn makes said inner and outer actions so effective as to facilitate the contact between the outer surface of the hollow structure and the inner surface of each sizing device. This serves to prevent the hollow structure from being deformed during shrinkage as well as to provide a higher efficiency of the heat exchange between the sizing devices and the hollow structure. Also, the hollow structure moves forward through the sizing devices with the outer surface of the former kept in contact with the inner surface of the latter, whereby the dimensions of the hollow structure as it is slowly cooled into a solidified state can be maintained exactly at a predetermined level controlled by the inner surface of each sizing device and accordingly the inner side surface and cross-sectional configuration of the hollow structure can also be maintained as predetermined. Further, the slow cooling of the hollow structure due to the removal of the coolant liquid provides a time for eliminating the internal stress involved in the extrusion manufacture and accordingly in the products resulting therefrom, and this serves to prevent any age-deformation of the products. Furthermore, if the hollow structure is of crystalline synthetic resin, there is provided a time during which the synthetic resin present in the hollow structure is crystallized, and this helps to increase the mechanical strength of the hollow structure products.

If the slow cooling of the hollow structure as it passes through the sizing devices is not sufficiently effected, adjustment may be made by raising the temperature of the coolant liquid used with the first sizing device 5a so as to reduce the temperature difference between the outer surface of the hollow and the inner surface of that particular sizing device which is in contact therewith, while successively lowering the temperature of the coolant liquid used for the succeeding devices 5a2 and 5a3 so as to provide the slow cooling of the hollow structure. If the effect of the slow cooling of the hollow structure should not be sufficient, the temperature of the coolant liquid used in the coolant liquid coating device 3a must be raised and/or the spacing between the coolant liquid coating device 3a and the coolant liquid take-off device 4a must be smaller. If this should result in no satisfactory effect, forced air cooling must be carried out by the use of the coolant liquid coating device 3a (which may be connected with a compressed air source (not shown), if required.)

If the internal stress in the hollow structure cannot be eliminated even by the above-described various adjustments, namely, the adjustment of the temperature of the coolant liquid, the adjustment of the spacing between the coolant liquid coating device 3a and the coolant liquid take-off device 4a, the adjustment of the temperature of the inner surface of the sizing device, and the use of the blown cooling air instead of coolant liquid, or if the crystallization of the hollow structure resin is not sufficiently attained, or if the said methods of adjustment can afford to provide products which have had any internal stress removed therefrom and/or which have a great mechanical strength but such methods accompany the decreased production efficiency which might lead to insufficient slow cooling of the hollow structure with a result of any residual internal stress and/or insufficient crystallization of the hollow structure, then the hollow structure which has once been solidified must be re-heated by the heating device 6a, if desired, up to its specific annealing temperature or above. This will be done by introducing a heating liquid into the chamber 63 of the heating device 6a through its inlet 61 and discharging the heating liquid now at a lower temperature through its outlet 62 to thereby maintain the inner surface of the heating device at a high temperature at all times, and by contacting the outer surface 17 of the hollow structure with the inner surface of the heating device by means of the suction force exerted on the opening means communicated with a vacuum source (not shown) through air passages 65 and exhaust pipe 64, so as to heat the hollow structure, if required, up to the resin annealing temperature or above so that any internal stress present in the hollow structure is eliminated and the resin crystallization progresses smoothly. In order to obtain a sufficient heating effect at this time, it is necessary that a plurality of heating devices 6a1, 6a2 and so on be disposed side by side. When it leaves all these devices the hollow structure is pinched by a plurality of pinch rollers 81 suitably spaced from the last heating device and guided out for a subsequent process.

Figure 2:
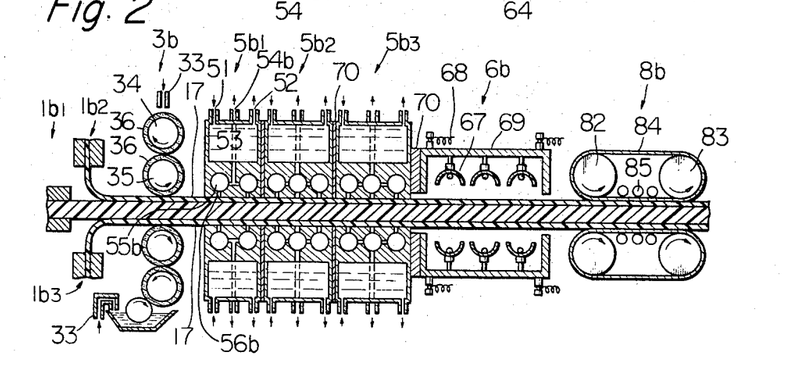
FIG. 2 is a longitudinal sectional view of another embodiment of the present invention used for making hollow board structure articles having therein a plurality of hollow portions arranged side by side as shown in FIG. 7.

Another embodiment of the present invention is shown in FIG. 2 and the product resulting from this embodiment is a hollow resin board structure having portions as shown in the cross-sectional view of FIG. 7. In such hollow structure comprising outer portions 18b and inner partitions 19b, the effect of the present invention is markedly greater than in the cylindrical structure comprising an annular outer portion 18a alone as shown in FIG. 6. The effect of the invention is still greater in the layer hollow resin board structure as shown in FIG. 9.

These alternative embodiments of the present introduced will now be described with respect to FIG. 2. A coolant liquid coating device 3b for applying coolant liquid to the upper and lower outer surfaces 17 of a hollow resin board structure integrally formed by solidified layer may more extruder devices 1b1, 1b2 and 1b3 comprises a pair of parallel coolant liquid supply pipes 33, a pair of spread rollers 34 and a pair of coating rollers solidified The spread rollers and coating rollers have elastic sponge members 36 attached to the entire outer peripheral surfaces thereof. The sponge members 36 on the rollers adjust the ethe coolant liquid to be applied whereby a required amount of the coolant liquid may be applied to the outer surfaces of the hollow resin board solidified layer formed on course the supply rate of the coolant from the supply pipe 33 is adjustable, and moreover the pressure entry spread rollers 34 and coating rollers 35 and the pressure between the coating solidified device according rollers 35 and the upper and lower surfaces 17 of the hollow resin board structure are also adjustable. Through the adjustment of these pressures may be adjusted the amount of the coolant liquid to be applied to the upper and lower surfaces. In the case where cooling water is applied through the roller coating type system as in this embodiment, it has been found that no inconvenience occurs even if provision is not made of a back-flow sucking device and a coolant liquid take-off device.

The removal of the coolant liquid from the outer surfaces 17 of the hollow board structure is accomplished by the suction from opening means 56b disposed in the inner part of a sizing device 5b1, and this means that the sizing device 5b1 also serves to remove the coolant liquid. It is therefore desirable that the vacuum source (not shown) with which the opening means 56b of the sizing device 5b1 are communicated be a water-air suction pump such as self-priming pump.

A second and a third sizing devices 5b2 and 5b 3 as shown in FIG. 2 are of the same construction and the same function as those shown in FIG. 1. When it leaves the sizing devices the hollow resin board structure enters heating devices 6b which are disposed in opposed relationship with each other and in suitably spaced relationship with the hollow board structure, and each of which comprises an outer cover 69 housing therein infrared heating lamps connected through wire leads 68 with a power source (not shown). As compared with the heating device 6a shown and described with respect to FIG. 1 which is adapted to heat the hollow structure through heat transmission, the heating devices 6b in the present embodiment heat the hollow structure through radiant heat which results in a merit of high thermal efficiency. A further merit of such heating devices 6b is that adjustment of heating can be readily obtained by turning off a suitable number of the lamps if desired. Further, the heating devices 6b can serve to eliminate the internal stress in the hollow structure through heating the same as well as to heat the hollow structure to the specific annealing point inherent to the resin of the structure and thereby expedite the crystallization thereof.

The thus re-heated hollow structure is drawn by a drawing device 8b provided behind the heating devices 6b in suitably spaced relationship therewith. The drawing device 8b comprises two sets of drive rollers 82 and 83 disposed symmetrically along the direction in which the hollow structure is moved, and driven separately from separate power sources (not shown) through endless belts 84 which movably hold the hollow structure therebetween by means of dancing rollers 85 disposed between the rollers 82 and 83 of each set. In the drawing device of this type the hollow structure passes therethrough with its upper and lower surfaces held by the belts in said manner without any substantial pressure applied to said surfaces, and this leads to an advantage that the hollow structure is prevented from any deformation.

Figure 3:
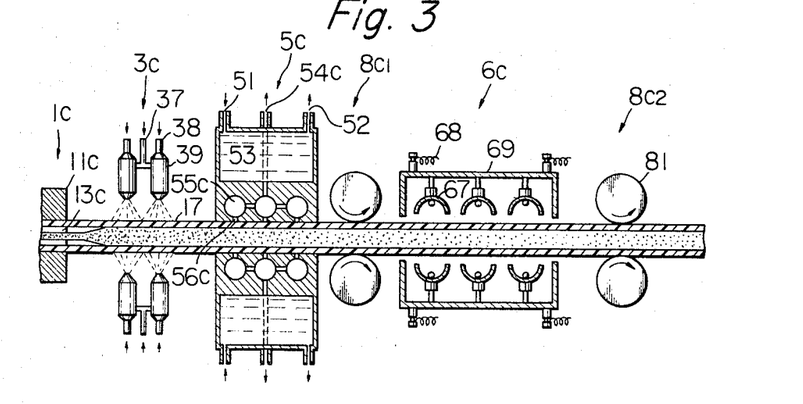
FIG. 3 shows a cross section of still another embodiment of the present invention used for making hollow board structure articles having the hollow portions thereof filled with foamable thermoplastic synthetic resin as shown in FIG. 8.

Still another embodiment of the present invention is shown in FIG. 3. This apparatus is directed for the manufacture of hollow structures having hollow portions thereof filled with foamable thermoplastic synthetic resin as the filler material, as is shown in FIG. 8. A die 11c has therein a mandrel 13c provided with a passage therethrough for filling the hollow portion of the hollow structure with foamable thermoplastic synthetic resin which is extruded from a separate extruder device (not shown). The cross section of the hollow member extruded by such die device 1c takes the configuration of the hollow member comprising structures 18c and 19c enclosing hollow portions 16c1, 16c2 and so on filled with foamable material, as shown in FIG. 8. In the apparatus according to this embodiment, use is made of a spray type coolant liquid coating device 3c which comprises opposed spray guns 39 having inlets 37 for coolant liquid and air passages 38 for spraying compressed air. Thus the coolant liquid is applied by spraying onto the upper and lower outer surfaces of the hollow resin board structure filled with foamable material. The adjustment of the amount of coolant liquid to be applied is accomplished by the adjustment of the flow rate of the coolant passing through the inlets 37 so as to normally permit a desired amount of coolant liquid to be sprayed through the spray guns. In the coolant liquid coating device of this type, a plurality of spray guns spray the cooling water for a sufficiently long time to substantially progress the water cooling of the hollow resin board structure and this leads to a high production capacity of such hollow structures. A sizing device 5c also serves as a coolant liquid sucking device similarly to those as shown in FIG. 2. A primary drawing device 8c1 disposed next to the sizing device draws the hollow board structure after it is subjected to sizing, and guides the hollow structure into heating device 6c disposed subsequently of the drawing device 8c1. The heating device 6c heats the hollow board structure so as to eliminate the internal stress therefrom. Next to the heating device 6c there is provided a secondary drawing device 8c2 which, together with the primary drawing device 8c1, prevents any tension from being imparted to the hollow resin board structure in the heating device 6c, and draws the hollow structure while helping the heating device to further eliminate the internal stress from said structure.

Figure 4:
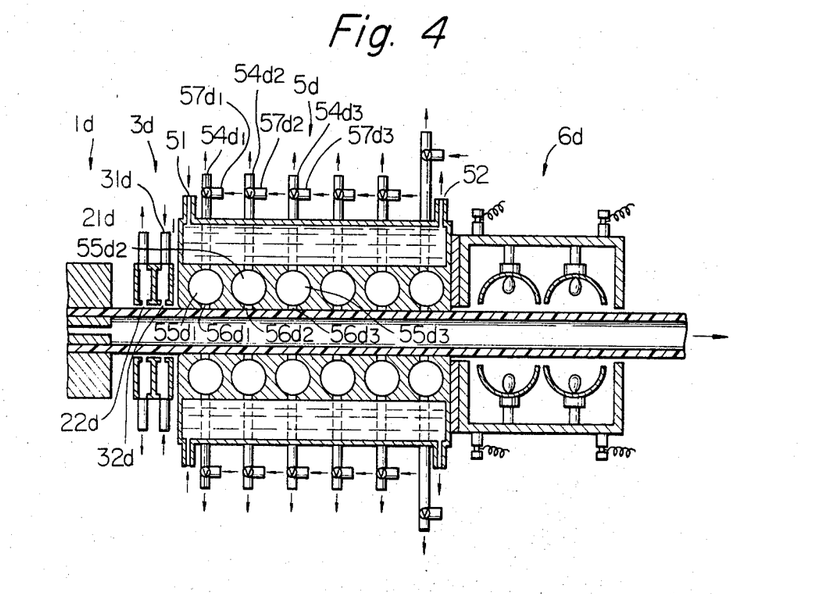
FIGS. 4 and 5 illustrates still further embodiments of the present invention.

FIG. 4 shows still another embodiment of the present invention. This alternative embodiment differs from the above-described embodiments in that the coolant liquid coating device 3d is integral with a coolant back-flow take-off device and that the inner part of the sizing device 5d provides a plurality of operational effects. The coolant liquid coating device 3d is of such construction that suction ports 22d communicating with a vacuum source (not shown) through exhaust pipes 21d are disposed in the device 3d toward the die device 1d so as to immediately eliminate any coolant liquid which would flow back toward the die device 1d, and moreover this construction is also compact with an advantage that the device 3d can be disposed in a limited spaced between the die device and the subsequent sizing device.

The feature of the sizing device lies in such construction that some of the opening means provided in the inner part of the sizing device are equilaterally spaced apart from the die device and the other opening means are differently spaced apart from the die device and that the opening means equilaterally spaced apart from the die device are communicated with a common sucking means while the opening means differently spaced apart from the die device are communicated with a different sucking means. For example, the opening means 56d1', 56d1'' and so on which are equilaterally spaced apart from the die device are communicated with a common passage 55d1 and the opening means 56d2', 56d2'' and so on which are differently spaced apart from the die device are communicated with a different passage 55d2, said passages being exposed to vacuum force from a vacuum source through their respective exhaust pipes 54d1, 54d2 and so on. Therefore, when no suction is needed by a first row of opening means 56d1', 56d1'' and so on, the vacuum pipe 54d1 with which these opening means are communicated may be closed to thereby stop the suction effect in said opening means alone. This holds true with a second and subsequent rows of opening means 56d2', 56d2'' and so on.

The exhaust pipes 54d1, 54d2 and so on in the suction mechanism of this sizing device 5d are provided with valves disposed intermediately of each exhaust pipe so as to close the exhaust pipes and these exhaust pipes are communicated with coolant inlets 57d1, 57d2 and so on which in turn communicate with a coolant liquid supply source and they are adapted to open and close said coolant liquid inlets. Because of such construction according to this embodiment, the coolant liquid is introduced through the foremost inlets 57d of the sizing device when the amount of the coolant liquid which can be applied by the coolant liquid coating device 3d is small, and the thus introduced coolant liquid is forced out of the foremost row of opening means 56d1', 56d1'' and so on to be applied onto the outer surfaces of the hollow board structure.

Also, in such construction of this embodiment, if the coolant liquid applied to the outer surfaces of the hollow structure by the coolant liquid coating device 3d is sucked and eliminated by the first row of opening means provided in the sizing device to thereby cause an insufficient cooling of the outer surfaces of the hollow structure member or an insufficient cooling of the entire hollow structure, when it is necessary to fully close the exhaust pipe valves so as to fully stop the suction in the first row of opening means 56d1', 56d1'' and so on or the second row of opening means 56d2', 56d2'' and so on as required, and to cool the entire hollow structure by means of coolant liquid until it reaches the third row of opening means.

According to this embodiment, as disclosed above, the smaller spacing between the die device 1d and the sizing device 5d results in an advantage of preventing any deformation from occurring in the deformable hollow structure between its extrusion from the die device 1d and its entry into the sizing device 5d. Another advantage resulting from this embodiment is that the length of time for cooling the hollow structure by means of coolant liquid after the coolant liquid has been applied to the hollow structure can readily be adjusted by adjusting the openable and closable opening means communicated with both of the vacuum source and the water supply device, without such inconvenience as seen in the FIG. 1 embodiment in which the coolant liquid coating device and the coolant liquid sucking device are moved for the adjustment of the spacing therebetween.

Figure 5:
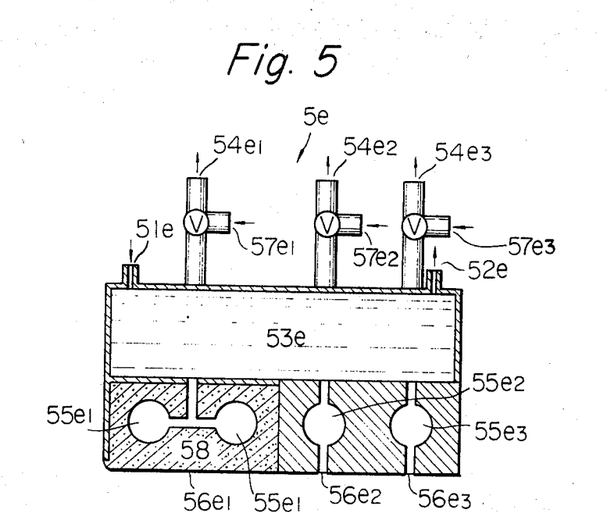

Still another embodiment of the present invention employs a sizing device of which the major portion is shown in FIG. 5. In this embodiment there is provided no coolant liquid spray device but, instead, the sizing device is constructed for versatile functions and adapted to serve as a coolant liquid spray device as well.

A portion of the inner part of a sizing device 5e which is adjacent the die device is formed of porous material 58 of continuous foams such as sintered metal. A fluid passage 55e1 is extended into said porous material. Coolant fluid supplied from its supply source is passed through an inlet 57e1, passage 55e1 and porous material 58, by opening the valve for this purpose, into the interior of the sizing device, and the coolant fluid permeates through the inner surface of the sizing device to cool the outer surface of the hollow structure. In this type of sizing, opening means 56e1 are provided by the continuous foams in the porous material 58, which form a great neumber of openings of an extremely small sectional area in the entire inner surface of the inner part of the sizing device. The amount of the coolant liquid to permeate through these opening means 56e1 is controlled by the pressure from the supply source. Such permeation of the coolant fluid through the entire inner surface of the sizing device prevents the hollow structure from adhering to the sizing device even if the hollow structure has a tacky or adhesive outer surface when it enters the sizing device. Therefore, if the hollow structure must be quickly cooled for a suitable length of time, it can be accomplished by introducing the coolant fluid from its supply source through the inlet 57e1. If the hollow structure does not have to or must not be quickly cooled, coolant air instead of coolant liquid may be introduced from its supply source. As the hollow structure enters the sizing device, the outer surface thereof may have its tackiness or adhesion slightly lost due to the natural cooling before its entry into the sizing device and a very thin solidified layer may be formed on said outer surface of the hollow structure. In such a case, the suction force through the opening means of a greater sectional area used in the previous embodiments would destroy such thin solidified layer on the outer surface of the hollow structure and again give birth to its tackiness or adhesion. According to the present embodiment, however, the opening means 56e1 of an extremely small sectional area provided in the entire inner surface of the sizing device are advantageous in that they never destroy such thin solidified layer formed on the outer surface of the hollow structure. Therefore, even if the outer surface of the hollow structure during its entry into the sizing device has slightly lost its tackiness or adhesion to form an extremely thin solidified layer thereon, the sizing device according to the present embodiment enables the suction force from the vacuum source to pass through exhaust pipe 54e1, passage 55e1 and porous material 58 by opening the valve for this purpose, and to act on the inner surface of the sizing device so as to bring the still deformable outer surface of the hollow structure into contact with said inner surface of the sizing device, whereby heat exchange is carried out between the coolant liquid in chamber 53e in the outer part of the sizing device and the hollow structure, and at the same time the outer dimensions of the hollow structure can be controlled by the inner surface of the sizing device.

The sizing device of this type has a merit in that it does not require the use of the coolant liquid coating devices as shown in FIGS. 1 to 4, and therefore requires no back-flow coolant take-off device, whereas it suffers from a demerit that the range of cooling adjustment is limited.

The features of the present invention are now apparent from the above disclosed embodiments. According to the present invention the die device in use may be of the air blow type 1a as shown in FIG. 1, or of the type which comprises a plurality of extruders (1b1, 1b2 and 1b3) as shown in FIG. 2, or of the type 1c having filler material inserted therein as shown in FIG. 3. The coolant liquid coating device may be of the shower type 3a as shown in FIG. 1, or of the roller coat type 3b as shown in FIG. 2, or of the spray type 3c as shown in FIG. 3. The coolant fluid used with the coolant coating device may be liquid or air as the case may be. The coolant liquid sucking device may be of the exclusive type 4a as shown in FIG. 1, or of the versatile type 5b, 5c, 5d as shown in FIGS. 2, 3 and 4. Use may be made of a plurality of sizing devices 5a1 etc. or 5b1 etc. as shown in FIGS. 1 and 2, or of a single sizing device 5c, 5d as shown in FIGS. 3 and 4. The heating device may be of the contact transmission type 6a as shown in FIG. 1, or of the radiation heating type 6b, 6c, 6d as shown in FIGS. 2, 3 and 4. Finally, the drawing device may be of the pinch roller type 8a as shown in FIG. 1, or of the endless-belt holding type 8b as shown in FIG. 2, or of the two-stage type 8c1, 8c2 separated by the heating device as shown in FIG. 3.

In addition, it is needless to say that each device may be changed or modified in design with the same result. The present invention also includes all methods of making hollow structure articles having or not having foamable filler material therein by the use of an apparatus comprising various combinations of said devices. Further, the present invention has been described with respect to the embodiments thereof in which the hollow structure extruded from the die device is horizontally moved forward, whereas the invention is not limited to such design but it may be desirable, if the situation permits, that the hollow structure extruded from the die device be vertically moved. If use is made of a vertical movement type apparatus, there will be an advantage not only that the coolant liquid can be readily applied from both sides but also that the deformable hollow structure can be better prevented from deformation between the die device and the sizing device.

What is claimed is:

1. A method of making a substantially stress-free thermoplastic synthetic resin hollow structure article having a predetermined cross-sectional configuration, comprising:
   a. heating thermoplastic synthetic resin at least to its melting point;
   b. extruding said thermoplastic synthetic resin by means of at least one extruder device and shaping the same into a continuous hollow structure;
   c. forcing coolant fluid to contact the outer surface of said shaped hollow structure while it is still at a high temperature and in a deformable state
   d. withdrawing said coolant fluid from contact with said outer surface and, thereby adjusting the contact time and amount of said fluid in contact with said outer surface to control the intensity of cooling thereof and quickly cool said outer surface to a solidified and non-tacky state while substantially avoiding retention of residual internal stress due to rapid solidification and shrinkage of the hollow structure;
   e. causing the solidified and non-tacky outer surface of said hollow structure to contact the inner surface of an externally disposed suction mechanism so as to control the outer dimensions of said hollow structure and impart said predetermined cross-sectional configuration thereto by means of said inner surface of said suction mechanism while slowly cooling said hollow structure by an externally disposed cooling mechanism through the inner surface thereof and maintaining said predetermined cross-sectional configuration.

2. A method as defined in claim 1 wherein when the molten thermoplastic synthetic resin hollow structure heated and extruded in an integral form from said extruder device is cooled and shaped by applying coolant fluid onto the outer surface thereof, any portion of said coolant which would flow back toward the extruder device is sucked and removed by exclusion means.

3. A method as defined in claim 1, wherein when the molten thermoplastic synthetic resin hollow structure extruded from said extruder device is cooled and shaped by applying the coolant fluid onto the outer surface thereof, the temperature of said coolant fluid is raised to reduce the temperature difference between the coolant fluid and the hollow structure to be cooled and thereby reduce the cooling of the hollow structure effected by said coolant fluid.

4. A method as defined in claim 1, wherein the application of the coolant fluid is carried out by showering the coolant fluid onto the outer surface of the structure.

5. A method as defined in claim 1, wherein said extruded hollow structure of thermoplastic synthetic resin is cooled and shaped by introducing compressed air into the hollow portion of said hollow structure in order to prevent the deformation of said structure as well as to promote good contact between the outer surface of the hollow structure and said inner surface of said suction mechanism.

6. A method as defined in claim 1, wherein opening means of said suction mechanism suck the coolant fluid whereby the sizing device also serves as a suitable take-off device.

7. A method of making thermoplastic synthetic resin hollow structure as defined in claim 1, wherein said suction mechanism for controlling the outer dimensions of said hollow structure is used to withdraw said coolant fluid from said outer surface, the suction action of each row of several rows of openings in said suction mechanism being started and stopped separately, and contact of coolant fluid with said outer surface of the hollow structure thereby being started and stopped separately in each of said rows.

8. A method as defined in claim 7, wherein the length of time for cooling the hollow structure by means of the coolant fluid is adjusted by selecting, in said suction mechanism, a suitable number of rows of said openings.

9. A method as claimed in claim 1, further comprising heating said thus cooled solid hollow structure to completely eliminate any residual internal stress therein and to increase the crystallization of the resins thereof.

10. A method as defined in claim 9, wherein said hollow structure is heated at least to the specific annealing temperature of the resin of said structure.

11. A method as defined in claim 9, wherein said heating is carried out in such a manner that the hollow structure is annealed in the heating device without being subjected to any tension because of a provision of drawing devices between the sizing device and the heating device and behind the heating device.

12. A method of making a substantially stress-free thermoplastic synthetic resin hollow structure article having a predetermined cross-sectional configuration comprising:
   a heating thermoplastic synthetic resin at least to its melting point;
   b. extruding said thermoplastic synthetic resin and forming it into an extruded continuous hollow structure of a predetermined cross-sectional configuration;
   c. contacting coolant fluid with upper and lower surfaces of said extruded continuous hollow structure of a predetermined cross-sectional configuration by means of at least one pair of suitable coolant applying devices while said hollow structure is still deformable;
   d. removing, at a suitable interval thereafter, said coolant fluid from said outer surfaces by means of a pair of take-off devices having suction force to thereby interrupt the cooling of the hollow structure effected by said coolant fluid, thereby quickly cooling said outer surface to a a solidified and non-tacky state while substantially avoiding retention of residual internal stress due to rapid solidification and shrinkage of the hollow structure;

e. imparting suction force to the inner surface of a suction mechanism in at least one set of opposed metallic sizing devices so as to contact the solidified and non-tacky upper and lower surfaces of the hollow structure with the corresponding inner surface of said sizing devices to thereby control the outer thickness of said hollow board structure by means of the distance between the inner surface of said opposed sizing devices while slowly cooling the hollow structure due to the contact between the metallic inner surface of said sizing devices and the solidified outer surface of the hollow board structure thereby sizing said hollow board structure into a predetermined cross-sectional configuration.

13. A method of making thermoplastic synthetic resin hollow structure articles as defined in claim 12, further comprising filling the hollow portion of the hollow structure with foamable thermoplastic synthetic resin.

14. A method as defined in claim 12, wherein when the molten thermoplastic synthetic resin hollow structure heated and extruded in an integral form is cooled and shaped by applying coolant fluid onto the outer surface thereof, any portion of said coolant which would flow back toward the die devices is sucked and removed by exclusion means.

15. A method as defined in claim 12, wherein when the molten thermoplastic synthetic resin hollow structure is cooled and shaped by applying said coolant fluid onto the outer surface thereof, the temperature of said coolant fluid is raised to reduce the temperature difference between the coolant fluid and the hollow structure to be cooled and thereby reduce the cooling of the hollow structure effected by said coolant fluid.

16. A method as defined in claim 12, wherein the application of the coolant fluid is carried out by showering the coolant fluid out to the outer surface of the structure.

17. A method as defined in claim 12, wherein the application of the coolant fluid is carried out by rolling the coolant fluid onto the outer surface of the structure.

18. A method as defined in claim 12, wherein the application of the coolant fluid is carried out by permeation of the coolant fluid through said sizing device.

19. A method as defined in claim 12, wherein opening means of said sizing device suck the coolant fluid whereby the sizing device also serves as a suitable take-off device.

20. A method of making thermoplastic synthetic resin hollow structure as defined in claim 12, wherein said sizing device for controlling the outer dimensions of said hollow structure is used to remove said coolant fluid from said outer surface suction action of each row of several rows of openings in said sizing device being started and stopped separately, and contact of coolant fluid with said outer surface of the hollow structure thereby being started and stopped separately in each of said rows.

21. A method as claimed in claim 12, further comprising re-heating said hollow board structure after said sizing by means of one or more sets of opposed heating means so as to completely eliminate any residual internal stress remaining therein and so as to increase the crystallization of the structure resin.

22. A method as defined in claim 21, wherein said re-heating is carried out by imparting thermal energy to the outer surface of said hollow structure by the use of a contact heat transmission system.

23. A method as defined in claim 21, wherein said re-heating is carried out by imparting thermal energy to the outlet surface of said hollow structure by use of a non-contact heat radiation system.

24. A method as defined in claim 21, wherein said re-heating is carried out in such a manner that the hollow structure is annealed in the heating device without being subjected to any tension because of the provision of drawing devices between the sizing device and the heating device and behind the heating device.

* * * * *